United States Patent [19]
Toth

[11] 3,869,984
[45] Mar. 11, 1975

[54] FLUID FILM THICKNESS SENSOR AND CONTROL SYSTEM FOR UTILIZING SAME

[75] Inventor: Thomas Daniel Toth, Euclid, Ohio

[73] Assignee: Addressograph-Multigraph Corporation, Cleveland, Ohio

[22] Filed: Aug. 6, 1973

[21] Appl. No.: 386,000

[52] U.S. Cl. .............................. 101/349, 73/150
[51] Int. Cl. ....................................... G01n 33/26
[58] Field of Search....... 73/150 A, 150 R; 101/349, 101/350

[56] References Cited
UNITED STATES PATENTS
3,191,528  6/1965  Jorgensen .......................... 101/148
3,442,121  5/1969  Wirz ................................... 73/150

Primary Examiner—S. Clement Swisher
Assistant Examiner—John S. Appleman
Attorney, Agent, or Firm—Michael A. Kondzella

[57] ABSTRACT

The interrelationship between two readily measurable shear responsive forces provides a means for determining the thickness of fluid films. This determination can be used to control the rate of feed of fluid to surfaces upon which the fluid films are formed, for example, the rate at which ink is fed to a printing machine.

21 Claims, 4 Drawing Figures

FLUID FILM THICKNESS SENSOR AND CONTROL SYSTEM FOR UTILIZING SAME

BACKGROUND OF THE INVENTION

This invention relates to a method and apparatus for measuring certain physical properties of fluids. In one of its more particular aspects it relates to the determination of the thickness of films of viscous fluids in systems in which such fluid is applied to the surfaces of rolls, webs or other similar surfaces. In another of its more particular aspects this invention relates to control of the thickness of films of such fluids.

The measurement and control of the thickness of fluid films upon various surfaces including the thickness of ink films upon rolls in printing presses, duplicating machines and the like and the thickness of films of various polymeric materials upon webs is of constant concern to those in industries in which the reproducibility of a process may depend upon maintaining a predetermined film thickness.

There are many difficulties involved in measuring and controlling the thickness of films, for example, of ink upon rolls in a lithographic printing press. For one, the measuring system itself must not disturb the quality of the printing. For another, the characteristics of ink are not consistently controlled in its manufacture and may change with the passage of time. Another source of difficulty is the fact that in use on lithographic printing equipment inks are mixed with dampening solutions which are used to prevent the ink from sticking to the master in non-image areas. Such dampening solution gradually works into the ink and changes its properties in variable degrees depending upon changing master images, time, and rates of feed of dampening solution. The properties of ink on a machine are also affected by ambient temperature and humidity and self-generated heat as well as by the working of the ink in the machine.

Repeated attempts to furnish devices for measuring and controlling ink properties and use have been made. A relatively recent approach is a device which measures the cohesive strength of the ink on a printing press. Another is a thickness measurement based upon relative roll speeds described by Ivary in copending application Ser. No. 167,336.

Although these devices have a certain limited utility in guiding a printing press operator as to ink properties, they do not tell him the effective ink film thickness and cannot readily be used to control ink feed automatically. This is for the reason that these prior art devices have been unable to compensate for the effects of multiple variables in a fashion to permit close control of the ink film thickness and hence of the quality of the finished printed sheet.

Accordingly, it is an object of this invention to measure the thickness of fluid films upon rolls, webs or other surfaces.

It is another object of the invention to provide a means for monitoring the thickness of fluid films upon machine surfaces.

Another object of this invention is to provide such means using economical and compact apparatus.

Another object of this invention is to determine film thickness without disturbing the film coated upon a machine surface.

It is a further object of this invention to provide a film thickness determination in machines which correlates reproducibly with the properties of the product produced in such machine, such as the optical density of printed images in a lithographic printing machine.

It is a still further object of this invention to provide automatic control apparatus for printing machines for controlling the density of a printed image by adjusting the rate of feed of ink to the machine.

These and other objects will become apparent to those skilled in the art through a consideration of the following disclosure and description of the invention.

SUMMARY OF THE INVENTION

The present invention utilizes the relationship between two shear responsive forces which can be measured independently of one another by means of economical and compact apparatus in order to determine the thickness of fluid films. One of the forces which is measured in this invention is directly proportional to film thickness and the other is inversely proportional thereto. By utilizing any of several relationships between these two forces a resultant which is essentially independent of variables other than film thickness can be derived.

Employment of suitable transducers enables the production of a signal representative of each of these two forces which can be combined to give a resultant which can be used to automatically control the operation of a machine in which it is desired to control the film thickness.

DESCRIPTION OF THE PREFERRED EMBODIMENTS

The invention will be described with reference to its use in a lithographic printing machine although it should be understood that other embodiments are also included within the scope of this invention.

Figure 1:
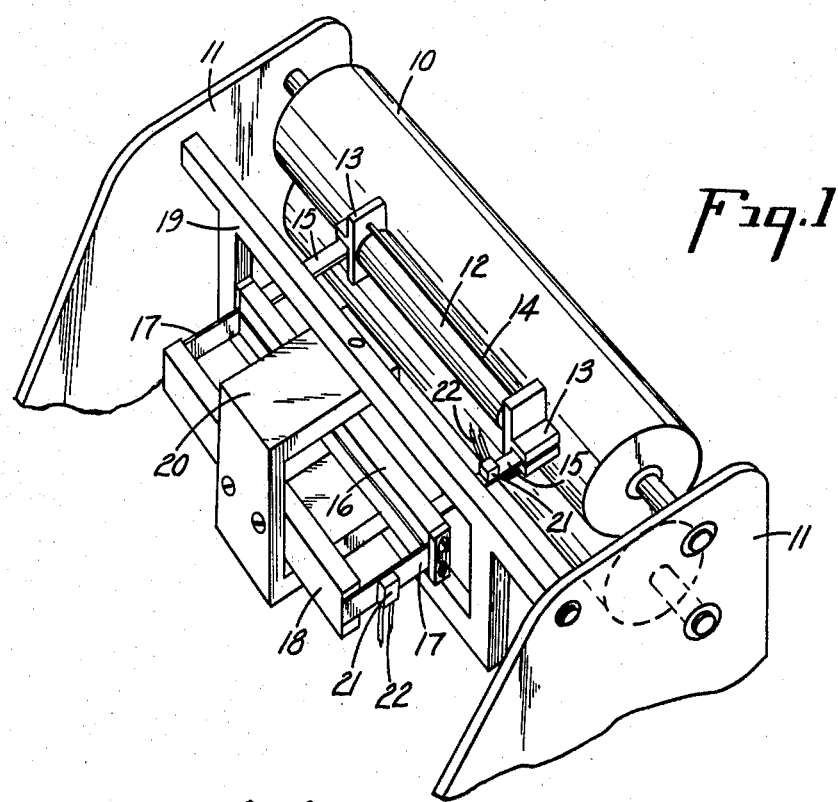
FIG. 1 is a perspective view of one embodiment of the present invention.

As shown in FIG. 1, vibrator roll 10 is rotatably mounted between supporting side plates 11 and contacts sensing roll 12 which is rotatably mounted between supporting blocks 13 which are held rigidly by tie bars 14, only one of which is shown. Horizontally mounted resilient support beams 15, are attached to blocks 13 and to bar 16. Beams 15 hold sensing roll 12 in a substantially horizontal position but permit small movements in the vertical plane. In a similar fashion vertically mounted resilient support beams 17 are attached to bar 16 and to bar 18. Beams 17 also maintain sensing roll 12 in a substantially horizontal position but permit small movements in the horizontal plane.

It will be seen that both sets of beams 15 and 17 are relatively thin in one dimension but relatively thick in the other two dimensions. These beams are preferably made of a relatively stiff but resilient material such as spring steel or brass. A slight movement of sensing roll 12 is therefore permitted in the horizontal plane by deflection of beams 17, and in the vertical plane by deflection of beams 15, but the forces exerted by beams 15 and 17 upon deflection tend to return sensing roll 12 to its normal position.

In order to prevent sensing roll 12 from twisting away from vibrator roll 10, beams 15 and 17 are gimbal mounted in support frame 19, which is pivotally supported in sides plates 11 and yoke 20, which is pivotally supported in support frame 19. By means of this mounting substantially parallel contact of sensing roll 12 with vibrator roll 10 will be maintained upon small horizontal or vertical movements of sensing roll 12. Thus the nip contact area between sensing roll 12 and vibrator roll 10 and the force necessary to maintain nip contact will be maintained essentially constant by gravity.

A transducer is disposed on at least one of each of beams 15 and 17 to signal the effect of translation of sensing roll 12 from the horizontal or vertical disposition in which it is normally maintained. In FIG. 1 the transducers are shown as strain gauges 21, although any type of transducer desired can be used. Leads 22 from strain gauges 21 connect with signal processing circuits to be described below.

Figure 2:
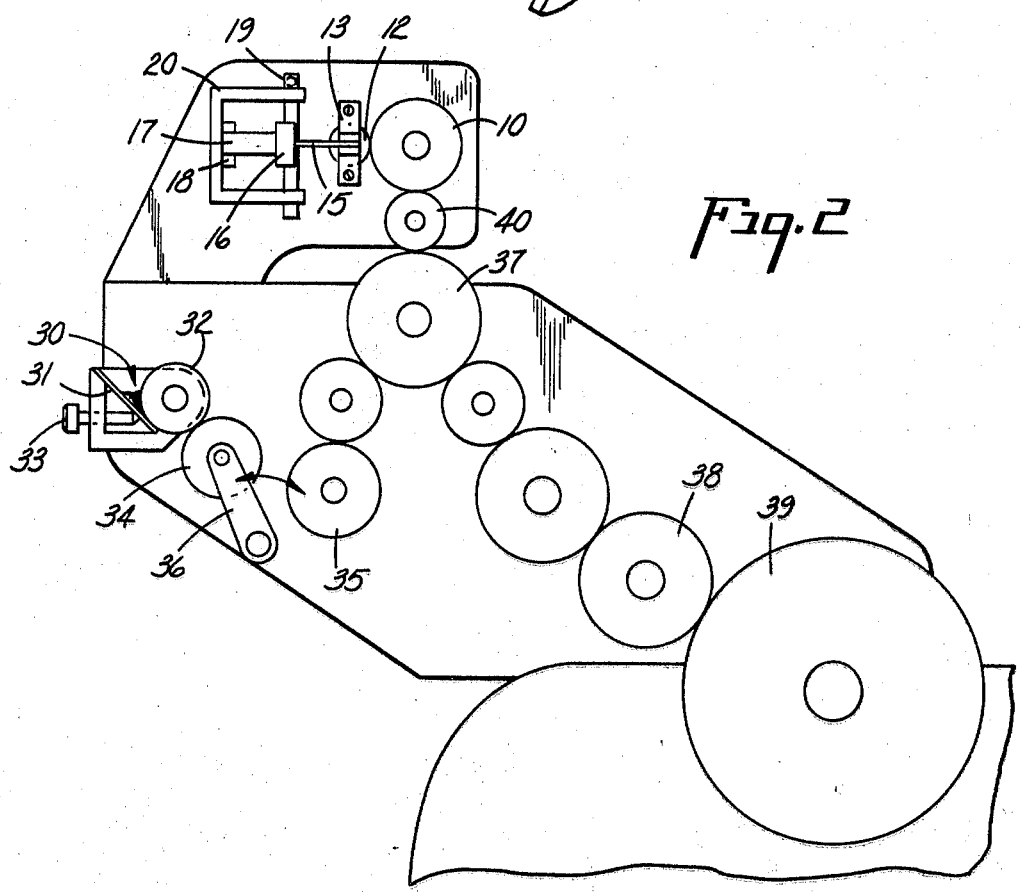
FIG. 2 is a diagrammatic side elevation of the sensor of the instant invention shown mounted on a conventional offset lithographic printing machine.

Referring now to FIG. 2 the sensor of the present invention is shown in a preferred embodiment mounted in a generalized conventional ink train for a lithographic printing press. Ink is placed in ink fountain 30. A metering blade 31 is pressed toward fountain roll 32 by adjusting screws 33, only one of which is shown, which are distributed in a line along one side of blade 31 to permit manual adjustment of the thickness of the ink to correspond with the requirements of the image being printed. In various applications fountain roll 32 may be rotated either continuously or for an adjustable fraction of a printing revolution, the latter being more usual. The result is that fountain roll 32 has a well defined layer of ink which squeezes past blade 31. Ductor roll 34 is not driven directly by the rotary power drive of the machine but instead rotates about its axis only when it touches fountain roll 32 or receiver roll 35 which usually is powered directly by the rotary drive of the machine. Ductor roll 34 revolves about its axis when the roll is moved into a suitable position by reciprocating movements of ductor roll support levers 36. When levers 36 bring ductor roll 34 into contact with fountain roll 32, ductor roll 34 revolves and picks up ink from fountain roll 32. When levers 36 bring ductor roll 34 into contact with receiver roll 35, ductor roll 34 revolves and deposits ink on receiver roll 35.

Subsequent rolls in the ink train such as vibrator roll 37 work the ink in the sense of kneading and mulling it and spread the ink evenly along the various rolls so that when the ink transfers from form roll 38 to master 39 the layer transferred will be evenly distributed in thickness and the ink will have the proper rheological characteristics. In the development of the present invention it has been found that the optical density of the printed output depends chiefly on the thickness of the ink film on form roll 38 which is proportional to the ink film thickness at any other location in the ink train. Depending upon the application ink film thickness measurements may be made anywhere along the ink train.

FIG. 2 shows the preferred location of vibrator roll 10, sensing roll 12, and associated mechanical and electronic equipment. Vibrator roll 10 is caused to oscillate axially by conventional methods such as an internal or external cam. Its rotational motion is preferably provided by frictional contact with other rolls in the ink train such as roll 40. In operation each of vibrator roll 10 and sensing roll 12 carries a film of ink representing a dynamic sample of the ink moving in the ink train. As the properties of ink in the train change the dynamic samples on vibrator roll 10 and sensing roll 12 change correspondingly.

Figure 3:
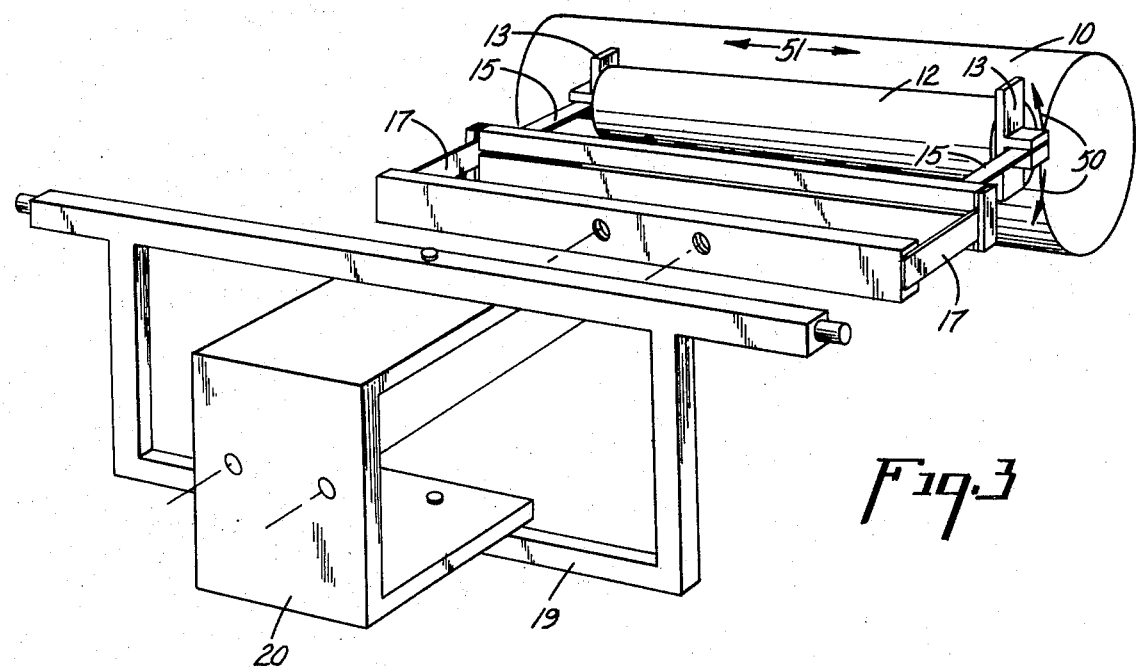
FIG. 3 is an exploded perspective view of a portion of the apparatus shown in FIG. 1.

Turning now to FIG. 3, as a vibrator roll 10 rotates the ink layer is split or torn apart at the nip between vibrator roll 10 and sensing roll 12. The resulting force acts on the axis of sensing roll 12 along the directions indicated by arrows 50. This force, the splitting shear force, is produced by the cohesion of the ink. As the cohesion of the ink increases, the splitting shear force increases, assuming constant machine speed and nip length. One essential element of the present invention is the sensing, measurement and utilization of this splitting shear force.

As vibrator roll 10 rotates, it is also caused to oscillate axially in the directions shown by arrows 51 by means of a conventional cam arrangement not shown. Oscillation of vibrator roll 10 results in the ink film between vibrator roll 10 and sensing roll 12 being sheared giving rise to a force which is called the sliding shear force which acts on the axis of sensing roll 12 along the directions indicated by arrows 51. The sliding shear force increases as the viscosity of the ink increases. A second essential element of the present invention is the sensing, measurement and utilization of this sliding shear force.

In order to promote wetting of vibrator roll 10 and sensing roll 12 by the ink used in the printing process, it is preferred to have the surfaces of vibrator roll 10 and sensing roll 12 covered with a polyamide, polyurethane or similar readily wettable material.

Vibrator roll 10 and sensing roll 12 must also have surfaces which are reasonably concentric to their rotational axes.

Since the thickness of the ink on the rolls varies from about 0.0002 in. to 0.0008 in. and the reproducible precision must be about one-tenth the nominal value, the rolls would have to be ground to within a tolerance of about ± 0.00005 in. in order to measure ink film thickness directly. Such close tolerances are difficult to attain, making the direct measurement of ink thickness impracticable.

Another problem encountered in the direct measurement of the ink film thickness arises because ink tends to pick up bits of paper and lint, making it lumpy and resulting in a variable film thickness. Direct measurement of ink thickness, then, reflects not only the thickness of the film of the ink itself but also the effect upon film thickness of undesirable pollutants. Signals produced as a result of such measurements would be subject to intolerable noise rendering the use of such signals undependable as an indication of ink film thickness.

In order to eliminate the disadvantages of direct measurement of ink film thickness advantage is taken of the fact that while each of the splitting shear force and sliding shear force is dependent upon a number of variables, relationships between these two forces can be derived in which most of these variables are cancelled out giving a resultant whose value depends essentially only upon the film thickness. In this preferred embodiment in order for such a resultant to be obtained it is essential that the splitting shear force and sliding shear force be measured independently of one another.

It is important to note, therefore, that forces due to tangential movement of sensing roll 12 relative to vibrator roll 10, which are a measure of the splitting shear force, produce deflections only in horizontally mounted beams 15 while forces produced by axial movement of sensing roll 12 relative to vibrator roll 10, which are a measure of the sliding shear force, produce deflections only in vertically mounted beams 17. That is, the deflection of beams 15 has no first order effect upon the deflection of beams 17 and the deflection of beams 17 has no first order effect upon the deflection of beams 15.

Splitting shear force, T, measured as the vertical deflection of beams 15 can be shown through engineering analysis to have the following relationship to the main force-determining components:

$$T = K_T v_s l t \eta / d$$

where $v_s$ is the surface speed of vibrator roll 10, $l$ is the nip length between sensing roll 12 and vibrator roll 10, $t$ is the film thickness, $\eta$ is the viscosity of the fluid whose film thickness is being determined, $d$ is the effective diameter of the equivalent of sensing roll 12 and vibrator roll 10, and $k_T$ is a constant of proportionality.

Similarly, the sliding shear force, A, measured as the horizontal deflection of beams 17 is given by the following expression:

$$A = k_A v_a a \eta / t$$

where $v_a$ is the axial speed of vibrator roll 10, $a$ is the nip area between sensing roll 12 and vibrator roll 10, $\eta$ is the viscosity of the fluid whose film thickness is being determined, $t$ is the film thickness and $k_A$ is a constant of proportionality.

Since $a$, $l$, and $d$ are design constants in the above apparatus and because the cam mechanism driving vibrator roll 10 axially produces axial speed proportional to surface speed for a given roll diameter, $d$, by dividing the splitting shear force, T, by the sliding shear force, A, the following expression is obtained:

$$T/A = k_R t^2$$

where $k_R$ is a new constant of proportionality.

If the deflection of beams 15 is sensed and a suitable transducer used to produce a signal proportional to this deflection and if the deflection of beams 17 is likewise sensed and a suitable transducer used to produce a signal proportional to this deflection, a resultant can be obtained which is proportional to the square of the film thickness. Conversely, division of the sliding shear force, A, by the splitting shear force, T, gives a resultant proportional to the reciprocal of the square of the film thickness.

While it is believed that the above described theory is correct and applicable and that the apparatus does perform as described, it is not intended that this invention be limited by the above explanatory material but only by the appended claims.

It will be apparent to those skilled in the art that the above defined relationships can be employed usefully in ways other than by division. For example, by applying suitable constants of proportionality to make the signal corresponding to the splitting shear force equal to the signal corresponding to the sliding shear force, a subtractive scheme can be used. By multiplying the two quantities the film thickness cancels out and there is obtained a resultant signal which characterizes the rheological properties of the fluid film. Any of these techniques may be conveniently used to produce a resultant signal which is useful in controlling the operation of a machine in which it is desired to control the film thickness as will be described below.

Figure 4:
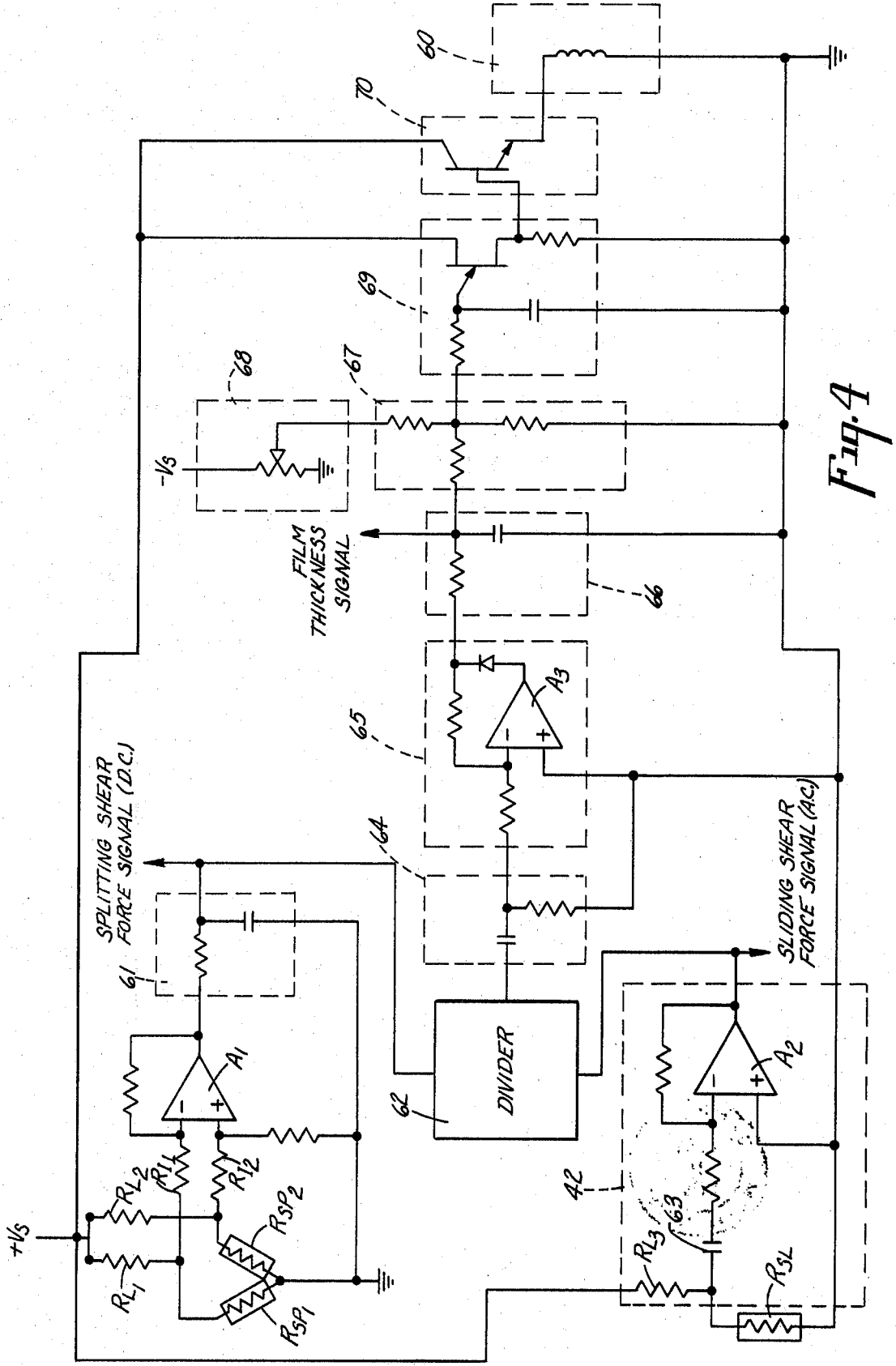
FIG. 4 is a schematic diagram of an electrical control system according to one embodiment of the present invention.

Referring now to FIG. 4 a schematic diagram of a preferred embodiment of the circuitry associated with the present invention is illustrated. Basically this circuit provides an output signal which is representative of the value of A/T, that is the sliding shear force divided by the splitting shear force as defined above. This output signal is proportional to the reciprocal of the square of the film thickness and is further processed to provide pulsing of solenoid 60 which controls the movement of ductor roll 34, for example.

The splitting shear force is sensed by conventional strain gauges 21, with the resistance of each strain gauge being proportional to its elongation. The resistance associated with the splitting shear force strain gauges are indicated at $R_{sp_1}$ and $R_{sp_2}$, each of which is connected between ground and an appropriate D.C. voltage $+V_s$ through load resistors $R_{L_1}$ and $R_{L_2}$. Strain gauge resistors $R_{sp_1}$ and $R_{sp_2}$ are also connected to the inputs of a conventional operational amplifier $A_1$, through input resistors $R_{I_1}$ and $R_{I_2}$. The output of operational amplifier $A_1$ is proportional to the splitting shear force, T, sensed by the strain gauges 21. A low pass filter, generally indicated by the numeral 61, is connected to the output of amplifier $A_1$ to remove any A.C. from the output due to noise or the like. This signal is fed preferably as the denominator to a divider 62 which may be a commerically available integrated ciruit.

The sliding shear force strain guage provides a variable resistance $R_{SL}$ which is connected between ground and $+V_s$ through a load resistor $R_{L_3}$. The value of $R_{SL}$ changes with time to provide a signal which approximates a square wave. This signal is passed through an A.C. coupling capacitor 63 to an operational amplifier $A_2$. The output of operational amplifier $A_2$ approximates a square wave whose amplitude is proportional to the sliding shear force, A. This signal is fed to divider circuit 62, preferably as the numerator, where it is divided by the splitting shear force signal.

The output of divider circuit 62 is equal to the quotient of the sliding shear force signal divided by the splitting shear force signal and is fed through a high pass filter, generally indicated by the numeral 64 to an operational amplifier $A_3$ which is appropriately connected to define a full wave rectifier, generally indicated by the numeral 65. A low pass filter, generally indicated by the numeral 66, removes any A.C. components from the output of rectifier 65 to provide a film thickness signal which is proportional to the reciprocal of the square of the film thickness. If desired, this signal may be utilized to provide a display by way of a high impedance meter, chart recorder or other device.

Although the production of a signal indicative of film thickness has been exemplified by means of the use of strain gauges, other electrical means can be utilized for this purpose. For example, the deflections due to splitting shear force and sliding shear force may be measured by means of low-friction potentiometers, optical beam attenuators with photoelectric cell sensors, capacitive sensors and the like.

Furthermore, instead of using electrical means for this purpose a fluidic system utilizing hydraulic or pneumatic pressure signals or a mechanical system utilizing force or velocity signals could be employed. In a preferred embodiment of this invention this signal is utilized to control the film thickness as described below.

A group of resistors, generally indicated by the numeral 67, defines a subtractor circuit, the output voltage of which is equal to the difference between the film thickness signal and a desired film thickness voltage setting from an adjustable potentiometer 68. The output of subtractor circuit 67 is fed to an appropriate voltage-to-frequency converter, generally indicated by numeral 69, which provides a signal to ductor control solenoid 60 through amplifier transistor 70.

It will be appreciated that the input to voltage-to-frequency converter 69 is representative of an "error" signal, that is, the difference between the sensed film thickness and the desired film thickness. The "error" signal increases above zero when the film thickness exceeds the desired amount and, conversely, decreases below zero when the desired amount exceeds the sensed thickness.

As described above and illustrated in FIG. 2, ductor roll 34 is swivelled back and forth by ductor roll support levers 36 which are driven by an appropriate mechanism powered by the drive which rotates the rolls, cylinders, paper feed and other components of the machine. Solenoid 60, which is illustrated in FIG. 4, operates an interposer lever, or other means which prevents the ductor roll support levers 36 from cycling while solenoid 60 is de-energized. No ink is thus fed to the ink train between pulses of the voltage-to-frequency converter 69. It will be appreciated that when the ink thickness is correct (the "error" signal is zero), the ductor control solenoid 60 is pulsed at a predetermined rate which provides normal ink feed. The pulse rate determined by the voltage-to-frequency converter 69 changes sufficiently to provide the proper ink feed rate. For example, should the ink thickness be considerably less than the desired thickness, the ductor would be cycled at a relatively high rate. On the other hand, should the thickness be considerably greater than the desired thickness, the pulse rate would decrease toward zero. By selecting the proper circuit parameters, the sensitivity of the overall circuit will be such that the circuit responds quickly to slight changes in ink film thickness, thereby maintaining the quality of the printed copies within acceptable tolerances.

It should be noted that the circuit illustrated in FIG. 4 is merely representative of a typical circuit which may be utilized in this invention to process the signals from the strain gauges to control the ductor solenoid. Other circuits may be employed to achieve substantially the same results. Furthermore, it may be desirable to enhance or refine the circuit illustrated in FIG. 4 by providing buffer amplifiers and additonal circuit components to improve the sensitivity of the circuit to control the ductor solenoid within close tolerances. It will also be appreciated that the circuit may be provided with an "error" signal integrating stage to compensate for load changes in the system. Further, an "error" signal differentiating stage may be provided to improve the transient response of the control system and permit higher gain in the voltage-to-frequency converter without giving rise to undesired oscillation of the control signals.

It should also be noted that the above-described control may be implemented by utilizing hydraulic or pneumatic pressure signals rather than voltage changes due to variations in the strain gauge resistances. Such arrangements might be advantageous when utilizing the present invention in applications involving the coating of webs requiring the use of flammable solvents which might present a fire hazard if exposed to electrical sparking.

It will be evident to those skilled in the art that sliding shear force can be measured not only by axial shearing, but could as well be measured by providing tangential shearing distinguishable from the splitting shear force by periodically braking the rotation of sensing roll 12 with an electromagnetic clutch, reading tangential force during braked intervals as sliding shear force and during unbraked intervals as splitting shear force.

In another embodiment, sensing roll 12 could be a conical roll, freely rotatable about its axis, mounted so its surface, rather than its axis, is parallel to the surface it touches. In this case the splitting shear force would be measured as one kind of torque tending to move the axis of the sensing roll tangentially along the moving liquid film surface, while the sliding shear force would be measured as a twisting torque tending to rotate the sensing roll about an axis perpendicular to its free rotational axis.

Further, the usefulness of this invention is not limited to lithographic or other printing machinery. For example, in the web coating of films and paper, the same information could be utilized. In some cases it may be useful to replace the vibrator roll 10 with a passing web which does not oscillate. In such case it may be desirable to oscillate the sensing roll and its supporting mechanism to develop the sliding shear force information required. Another way of measuring the sliding shear force is to measure the viscosity of a material to be coated upon a web prior to applying such material to the web. Either splitting or sliding shear force information may be acquired in completely different ways and used in a way analogous to that described herein to achieve the objects of this invention but without departing from its scope.

It is intended that this invention be limited only by the claims herein and not by the specification and drawing which are merely descriptive of a preferred embodiment of the invention.

What is claimed is:

1. A process for determining the thickness of a fluid film which comprises generating signals representative of two shear responsive forces acting upon said fluid film, one of said shear responsive forces being directly proportional to the thickness of said fluid film and the other of said shear responsive forces being inversely proportional to the thickness of said fluid film, and combining said signals to obtain a resultant signal which is representative of the thickness of said fluid film and independent of other variables which affect said two shear responsive forces.

2. A process according to claim 1 wherein said two shear responsive forces act approximately perpendicularly to each other.

3. A process according to claim 1 wherein one of said two shear responsive forces acts tangentially with respect to a surface upon which said fluid film is deposited and the other of said two shear responsive forces acts axially with respect to said surface.

4. A process according to claim 1 wherein said two shear responsive forces are the splitting shear force and the sliding shear force.

5. A process according to claim 1 wherein said resultant signal is obtained by dividing the signal representative of one shear responsive force by the signal representative of the other shear responsive force.

6. A process according to claim 1 wherein said resultant signal is obtained by dividing the splitting shear force by the sliding shear force.

7. A process according to claim 1 wherein said resultant signal is obtained by dividing the sliding shear force by the splitting shear force.

8. A process according to claim 1 wherein said resultant signal is obtained by subtracting the signal representative of the splitting shear force from the signal representative of the sliding shear force.

9. A process according to claim 1 wherein said two shear responsive forces are measured at the point of contact between two surfaces upon which said fluid film is deposited.

10. A process according to claim 1 wherein one of said two shear responsive forces is measured by measuring the viscosity of the material which is used to form said fluid film.

11. An apparatus for determining the thickness of a fluid film which comprises
  means for independently generating signals representative of two shear responsive forces acting upon said fluid film at the point of contact between two surfaces upon which said fluid film is deposited, one of said shear responsive forces being directly proportional to the thicknness of said fluid film and the other of said shear responsive forces being inversely proportional to the thickness of said fluid film,
  and means for combining said signals to obtain a resultant signal which is representative of the thickness of said fluid film and independent of other variables which affect said two shear responsive forces.

12. An apparatus according to claim 11 wherein said two shear responsive forces are the splitting shear force and the sliding shear force.

13. An apparatus according to claim 11 wherein one of said two shear responsive forces acts tangentially with respect to a surface upon which said fluid film is deposited and the other of said two shear responsive forces acts axially with respect to said surface.

14. An apparatus according to claim 11 wherein said means for combining said two signals includes means for dividing the signal representative of one shear responsive force by the signal representative of the other shear responsive force.

15. An apparatus according to claim 11 wherein said means for combining said two signals includes means for dividing the signal representative of the splitting shear force by the signal representative of the sliding shear force.

16. An apparatus according to claim 11 wherein said means for combining said two signals includes means for dividing the signal representative of the sliding shear force by the signal representative of the splitting shear force.

17. An apparatus according to claim 11 wherein said means for combining said two signals includes means for subtracting the signal representative of the splitting shear force from the signal representative of the sliding shear force.

18. An apparatus according to claim 11 wherein said means for generating said two signals comprise first resilient means disposed for deflection essentially only in a vertical plane upon movement of one of said two surfaces and second resilient means disposed for deflection essentially only in a horizontal plane upon movement of said one of said two surfaces.

19. An apparatus for determining the thickness of a fluid film which comprises
  a sensing roll adapted to be revolved about its axis by frictional contact with a surface upon which said fluid film is deposited,
  means for producing relative axial motion between said sensing roll and said surface,
  first support means for said sensing roll permitting resiliently restrained motion of said snsing roll tangential to said surface and tending to prevent significant motion of said sensing roll axial to said surface,
  second support means for said sensing roll permitting resiliently restrained motion of said sensing roll axial to said surface and tending to prevent significant motion of said sensing roll tangential to said surface,
  first transducer means for converting said tangential motion of said sensing roll into a first signal representative of said tangential motion,
  second transducer means for converting said axial motion of said sensing roll into a second signal representative of said axial motion
  and means for combining said first and second signals to thereby derive a resultant signal representative of the thickness of said fluid film.

20. An apparatus for controlling the thickness of a fluid film which comprises
  means for independently generating signals representative of two shear responsive forces acting upon said fluid film at the point of contact between two surfaces upon which said fluid film is deposited, one of said shear responsive forces being directly proportional to the thickness of said fluid film and the other of said shear responsive forces being inversely proportional to the thickness of said fluid film,
  means for combining said signals to obtain a resultant signal which is representative of the thickness of said fluid film and independent of other variables which affect said two shear responsive forces
  and means responsive to said resultant signal for controlling the rate of feed to said surface of the material which is used to form said fluid film.

21. An apparatus for controlling the thickness of a fluid film which comprises
  a sensing roll adapted to be revolved about its axis by frictional contact with a surface upon which said fluid film is deposited,
  means for producing relative axial motion between said sensing roll and said surface,
  first support means for said sensing roll permitting resiliently restrained motion of said sensing roll tangential to said surface and tending to prevent significant motion of said sensing roll axial to said surface, second support means for said sensing roll permitting resiliently restrained motion of said sensing roll axial to said surface and tending to prevent significant motion of said sensing roll tangential to said surface, first transducer means for converting said tangential motion of said sensing roll into a first signal representative of said tangential motion, second transducer means for converting said axial motion of said sensing roll into a second signal representative of said axial motion, means for combining said first and second signals to thereby derive a resultant signal representative of the thickness of said fluid film and means responsive to said resultant signal for controlling the rate of feed to said surface of the material which is used to form said fluid film.

* * * * *

UNITED STATES PATENT OFFICE
CERTIFICATE OF CORRECTION

Patent No. 3,869,984          Dated  March 11, 1975

Inventor(s) Thomas D. Toth

It is certified that error appears in the above-identified patent and that said Letters Patent are hereby corrected as shown below:

Column 3, line 8, "sides" should read -- side --. Column 5, line 21, "K" should read -- k --. Column 6, line 37, "ciruit" should read -- circuit --; line 38, "guage" should read -- gauge --. Column 10, line 21, "snsing" should read -- sensing --.

Signed and sealed this 24th day of June 1975.

(SEAL)
Attest:

RUTH C. MASON
Attesting Officer

C. MARSHALL DANN
Commissioner of Patents
and Trademarks